April 27, 1954

R. F. RUSSELL 2,676,895

METHOD AND APPARATUS FOR APPLYING COATING
MATERIAL TO THE INSIDE OF A CONTAINER

Filed Dec. 29, 1949

RICHARD F. RUSSELL
INVENTOR.

BY
Burgess, Ryan + Hicks
ATTORNEYS

RICHARD F. RUSSELL
INVENTOR.

April 27, 1954  R. F. RUSSELL  2,676,895
METHOD AND APPARATUS FOR APPLYING COATING
MATERIAL TO THE INSIDE OF A CONTAINER
Filed Dec. 29, 1949  13 Sheets-Sheet 4

RICHARD F. RUSSELL
INVENTOR.

BY
ATTORNEYS

April 27, 1954  R. F. RUSSELL  2,676,895
METHOD AND APPARATUS FOR APPLYING COATING
MATERIAL TO THE INSIDE OF A CONTAINER
Filed Dec. 29, 1949  13 Sheets-Sheet 5

RICHARD F. RUSSELL
*INVENTOR.*

BY
*Burgess Ryan & Hicks*
*ATTORNEYS*

RICHARD F. RUSSELL
*INVENTOR.*

April 27, 1954 R. F. RUSSELL 2,676,895
METHOD AND APPARATUS FOR APPLYING COATING
MATERIAL TO THE INSIDE OF A CONTAINER
Filed Dec. 29, 1949 13 Sheets-Sheet 8

RICHARD F. RUSSELL
INVENTOR.

BY
ATTORNEYS

RICHARD F. RUSSELL
INVENTOR.

BY
ATTORNEYS

RICHARD F. RUSSELL
INVENTOR.

April 27, 1954   R. F. RUSSELL   2,676,895
METHOD AND APPARATUS FOR APPLYING COATING
MATERIAL TO THE INSIDE OF A CONTAINER
Filed Dec. 29, 1949   13 Sheets-Sheet 12

RICHARD F. RUSSELL
*INVENTOR.*

April 27, 1954   R. F. RUSSELL   2,676,895
METHOD AND APPARATUS FOR APPLYING COATING
MATERIAL TO THE INSIDE OF A CONTAINER
Filed Dec. 29, 1949   13 Sheets-Sheet 13

RICHARD F. RUSSELL
INVENTOR.

BY

ATTORNEYS

Patented Apr. 27, 1954

2,676,895

UNITED STATES PATENT OFFICE 2,676,895

METHOD AND APPARATUS FOR APPLYING COATING MATERIAL TO THE INSIDE OF A CONTAINER

Richard F. Russell, Elmira, N. Y., assignor to American - La France - Foamite Corporation, Elmira, N. Y., a corporation of New York Application December 29, 1949, Serial No. 135,704

22 Claims. (Cl. 117—50)

The present invention pertains to new and useful improvements in method and apparatus for applying coating material to the inside of a container It relates more particularly to a method and an apparatus for applying a coating of protective material such as tin to the interior of metal containers such as a fire extinguisher shell and at the same time, heat treating the metal container Prior to the present invention, the usual practice followed in applying a protective coating of a material such as tin to the interior of a fire extinguisher shell was to dip the entire shell in a hot bath of molten tin by hand The thickness of the coating of tin on the inside of the shell obtained by such a hand dipping operation was difficult to control and generally exceeded the thickness required to give the protection desired. In the case of costly coating materials such as tin, this increased the cost of the container considerably In addition, when the entire shell is dipped in hot tin, the exterior of the shell must be protected as by painting, in order to prevent the tin from adhering to the outside thereof, and this paint must then be removed from the exterior of the shell The present invention is directed to reducing the cost of manufacture of such containers. To accomplish this, it provides a method and apparatus for applying coating material such as tin to the interior of a vessel or container without hand dipping and in such a manner that a coating of the desired thickness is obtained This reduces the labor costs and results in a saving in the amount of coating material that is required to be used. In addition, the present invention provides for the reduction of losses due to wasteful "drag out" of coating material. Further, the present invention renders the painting of and the removal of paint from the outside of the containers prior to and after the dipping unnecessary.

The present invention also provides for a heat treatment of metal containers as they are being coated in order to relieve strains and to remove season cracks that may develop in containers made of certain metals due to hard working of the metal, such as seam welding, drawing, or riveting The present invention may be used for spray coating the interior of a container with any suitable material, either metal or chemical, that is fluid or can be made fluid (molten) in a temperature range up to and including 1,000° F. Examples of materials that are frequently used for protective coatings and which may be used in accordance with the present invention are tin, cadmium, and zinc. While in the embodiment of the invention described and illustrated herein, specific reference will be made to the coating of fire extinguisher shells, it will be understood that the invention can be readily adapted for use in coating the inside of any suitable container or vessel where a coating on the interior is desired or is an essential requirement.

Various other objects and advantages of the present invention will be apparent and will be best understood from the following description and the accompanying drawings in which.

Figure 1:
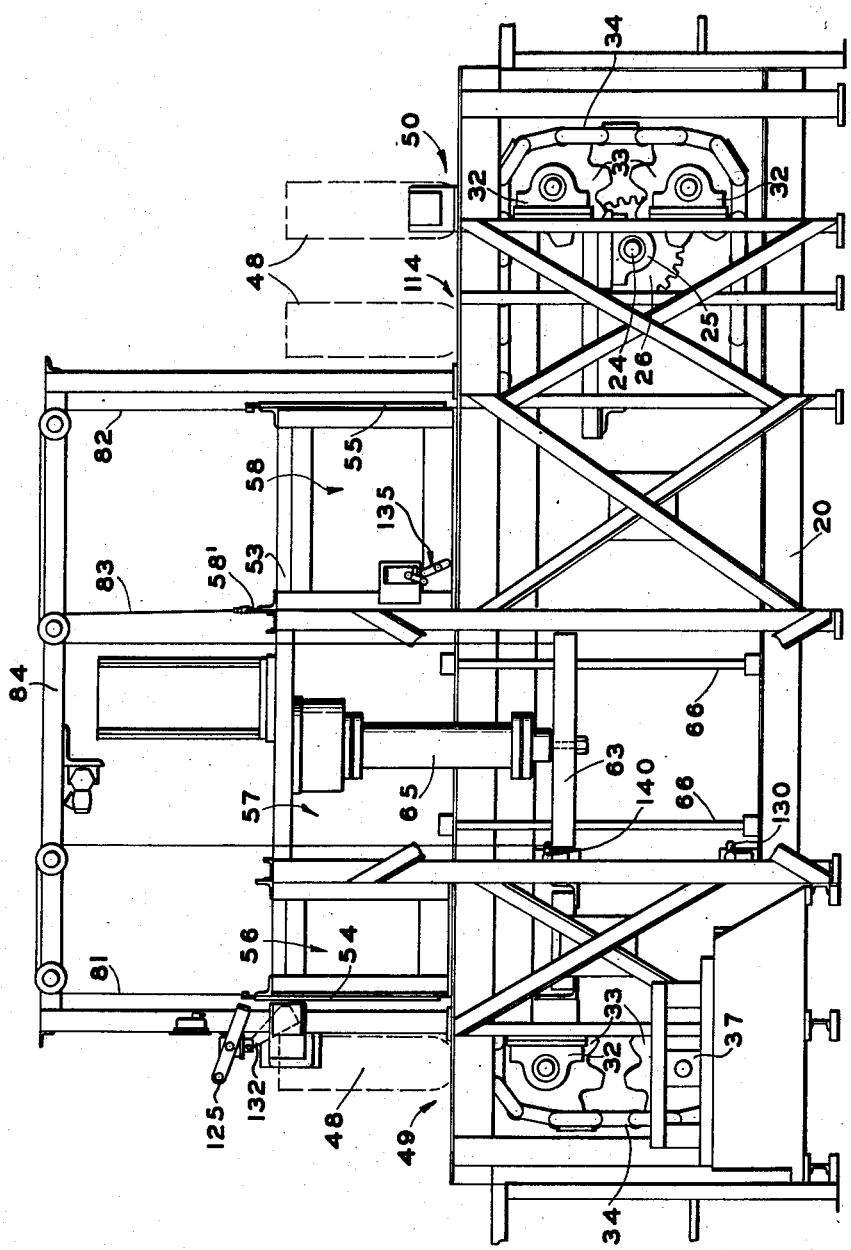
Fig. 1 is a side view of a machine embodying the invention.
Figure 2:
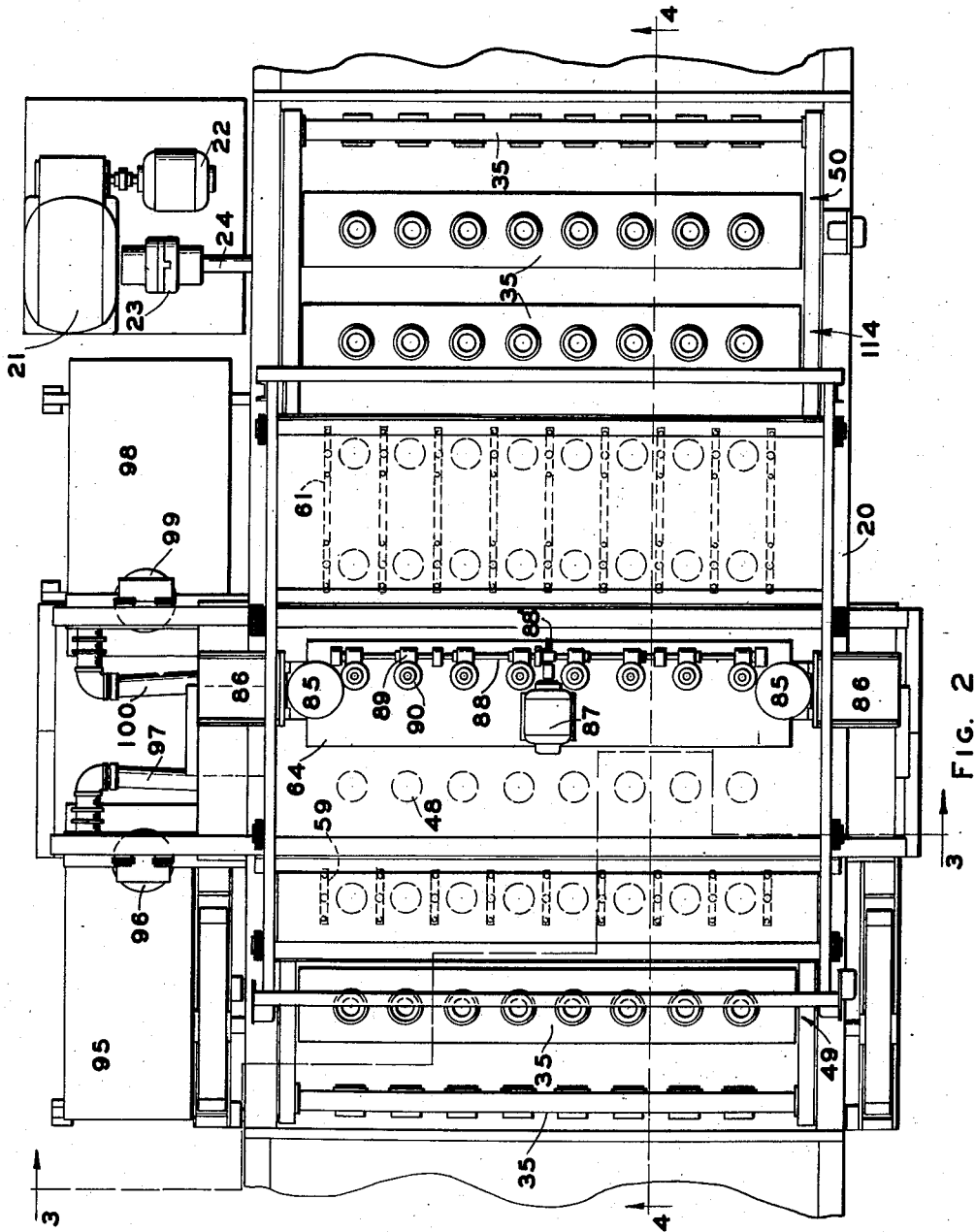
Fig. 2 is a plan view of the machine illustrated in Fig. 1.
Figure 3:
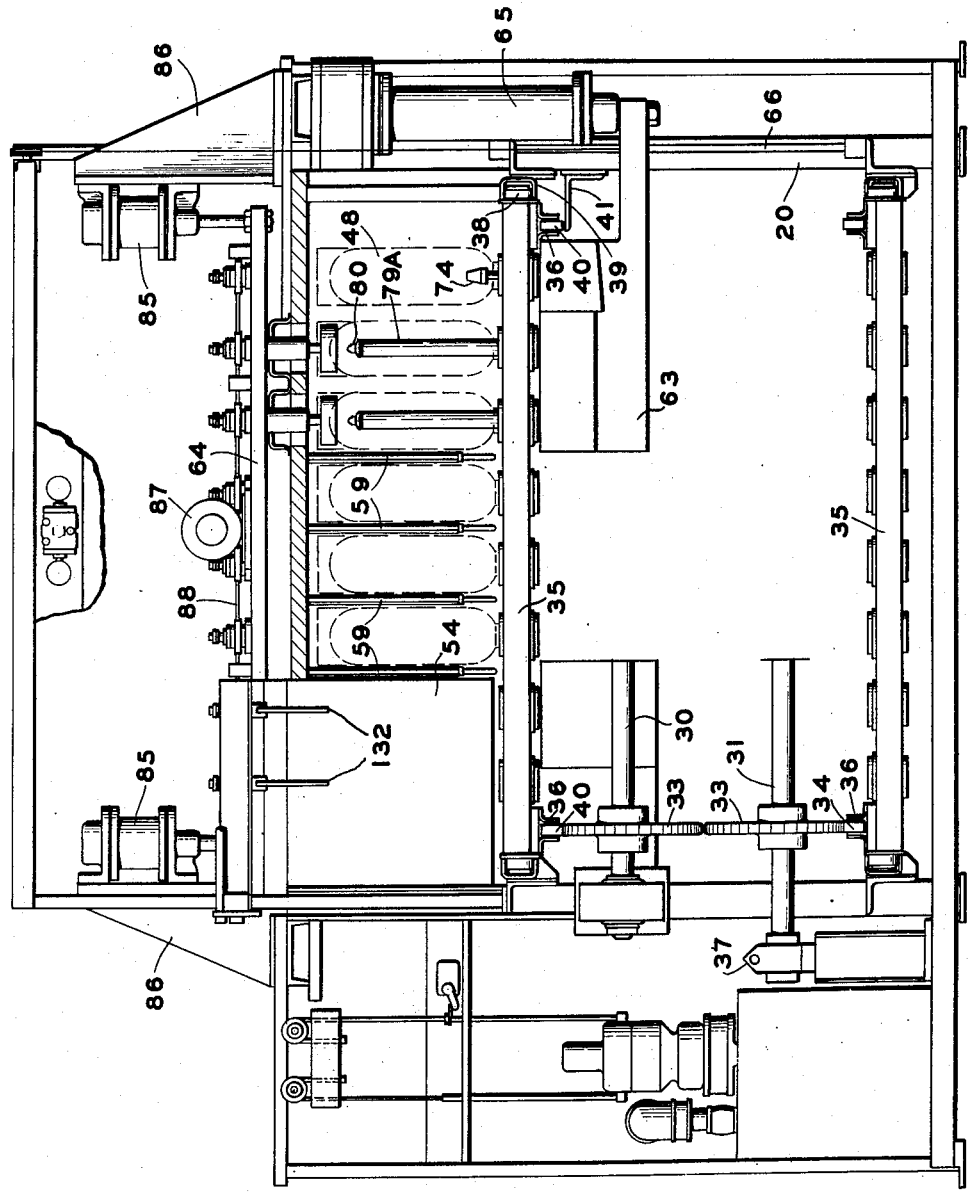
Fig. 3 is a section view taken along the line 3—3 of Fig. 2.

As shown best in Figs. 1–4, there is a framework 20 at one side of which a reduction unit or gear box 21 is mounted (see Fig. 2). The reduction unit 21 is driven by an electric motor 22 and is connected through a flexible coupling 23 to a drive shaft 24. The drive shaft 24 extends transversely of the machine and is supported in anti-friction bearing pillow blocks 25 that are secured to the frame 20.

Intermediate the ends of the drive shaft 24, a bull or drive gear 26 is mounted on and keyed to the drive shaft. As shown best in Fig. 4, the bull gear 26 meshes with and drives a secondary gear 27 that is mounted on and keyed to a conveyor drive shaft 28.

In addition to the conveyor drive shaft 28 there are three other conveyor shafts 29, 30 and 31 that are located in spaced relation to each other around the frame 20. Each of the conveyor shafts extends transversely across the frame and may be rotatably mounted in bearings 32 that are secured to the frame 20. Machined chain sprockets 33 are secured at both ends of each conveyor shaft and a link chain belt 34 extends around the sprockets 33 on the respective ends of each of the conveyor shafts 28–31 at the opposite sides of the frame 20.

Flight or carrier plates 35, on which the work is to be mounted, extend across the frame 20 and are secured at spaced intervals to links of the chain belts 34 by brackets 36. The chain belts 34 with the carrier plates 35 secured thereto thus form a continuous conveyor that travels horizontally in step by step movements over the table or work surface of the machine, then downward at the end of the machine and returns horizontally beneath the work area to the forward end, and then upward to the starting or loading point. A chain tightener may be provided for tightening the chain belts 34 or one of the conveyor shafts 28–31 may be adjustably mounted on the frame 20 as indicated at 37 (see Figs. 1 and 3).

Figure 5:
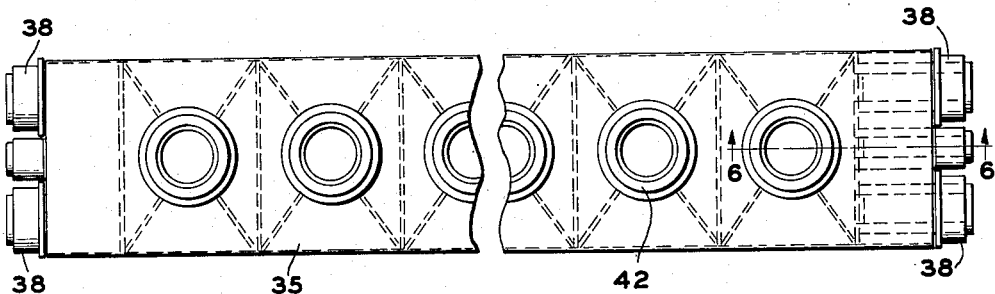
Fig. 5 is a plan view of a carrier plate such as used in the machine shown in Fig. 1.
Figure 6:
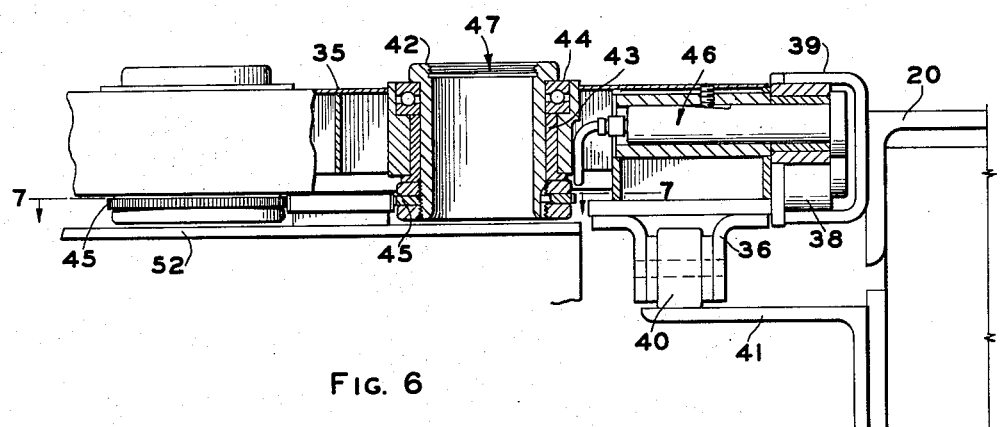
Fig. 6 is a fragmentary view in section along the line 6—6 of Fig. 5.
Figure 7:
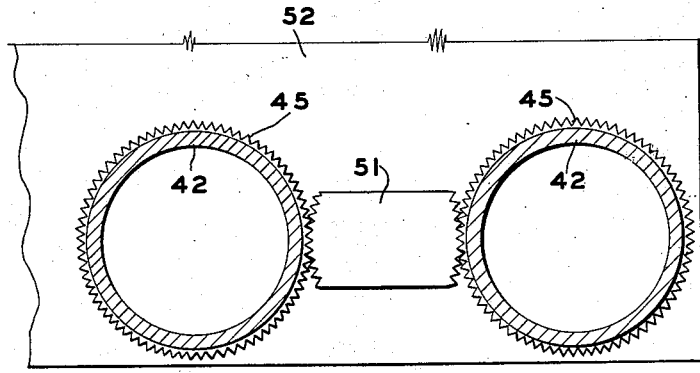
Fig. 7 is a section view taken along the line 7—7 of Fig. 6.

The details of the carrier plates 35 are shown best in Figs. 5–7. As shown therein, the ends of the carrier plates 35 are equipped with equalizing flanged rollers 38 that run in a channel or track 39 secured to the frame 20. Rollers 40 of the chain belts 34 ride on carrier angles 41 that extend inwardly from the frame 20. This arrangement provides a free running, self-aligning mechanism with all weight being carried by the frame 20.

The carrier plates 35 may be fabricated from stainless steel sheets and each plate forms a support for a row of rotatable work-carrying sleeves 42. The rotatable sleeves 42 are mounted on the carrier plates in plain and anti-friction bearings 43 and 44 and the lower ends of the work-carrying sleeves are provided with toothed rings 45 that are keyed to the sleeves. If necessary, the interior of the sleeve 42 may be lined with a ring of drawn aluminum or other suitable material held in position by the top or work holding ring on the sleeve 42 providing an air space between the sleeve and this inner ring to prevent heat transfer and the chilling of hot metal coating materials that may flow over the sleeves during the work cycle. A one-shot lubricating system, as indicated at 46 in Fig. 6, may be provided for supplying lubricants capable of withstanding high temperatures to the rotatable sleeves 42 and the flanged rollers 38.

The upper ends of the sleeves 42 are provided with suitable means such as threads 47, for securing a container 48 (indicated by the broken lines) in an inverted position on top of each of the rotatable sleeves 42 on the carrier plates 35. The containers 48 are secured to the sleeves on each carrier plate 35 as it reaches a loading station as indicated at 49. After the containers have passed through the work area and have been permitted to cool, they are removed from each carrier plate 35 as it reaches an unloading station as indicated at 50.

At the loading and unloading stations 49 and 50, a series of racks 51 are yieldably supported on bars 52 that are located beneath the carrier plates 35 at the loading and unloading stations. As a carrier plate reaches either the loading or the unloading stations 49 and 50, the yieldably mounted racks 51 enter between each pair of the rotatable sleeves 42 and engage with the toothed rings 45 on lower ends of the sleeves to hold the sleeves against rotating while the carrier plates are being loaded and unloaded.

Upon leaving the loading station, the loaded carrier plate 35 with a container 48 supported in inverted position on each of its rotatable sleeves enters an enclosed chamber 53 that is suitably insulated to prevent heat loss. As seen best in Fig. 4, the chamber 53 has doors 54 and 55 that are automatically raised and lowered at proper times to permit the carrier plates and the containers supported thereon to enter and leave the chamber.

In the illustrated embodiment of the invention, the chamber 53 is divided into three zones 56, 57 and 58. The first zone 56 is a preheating zone in which the temperature of the containers is raised to a temperature consistent with the work to be performed. When a coating such as tin is to be applied, this temperature will be in the neighborhood of 350° F. In the second or central zone 57, a flux, if one is required, is applied at 130° F. to the inside of each of the containers supported on the carrier plate at a fluxing position of the conveyor while coating material at 575° F. is simultaneously applied to the inside of fluxed containers supported on the carrier plate at the next position of the conveyor in this zone. The final zone 58 is a heat treatment zone and it may be separated from the central zone by a door 58' that is also automatically raised and lowered at the proper time. In this zone, the containers with their insides having been coated are heated to the temperature of 600° F. and for the time required for heat treating the particular metal from which the container is made to relieve strains and season cracks such as may result from the hard working of the metal from which the containers are made. In addition, any excess coating material is drained from the interior of the containers in this zone and is returned to its source to be used over again.

Electrical heating units 59, 60, 61 and 62 of the resistance type may be employed to provide controlled heat in the preheating and heating zones of the chamber 53. However, other suitable means of obtaining controlled heat may be used for this purpose if desired. The heating units 59 and 61 are fastened to bus bars and are suspended from the roof of the chamber 53 at points along the side walls and between each row of containers in the preheating and heat treating zones, respectively. The heating units 60 and 62 are located beneath the carrier plates 35 and are supported by the floor of the chamber 53 in the preheating and heat treating zones, respectively.

Located at the central zone 57, in which the insides of the containers are fluxed and tinned, there is a lower elevator 63 and an upper elevator 64. The lower elevator 63 may be operated in any suitable manner such as pneumatic or hydraulic operated, double-acting cylinders 65 that are located on opposite sides of the frame 20.

Figure 9:
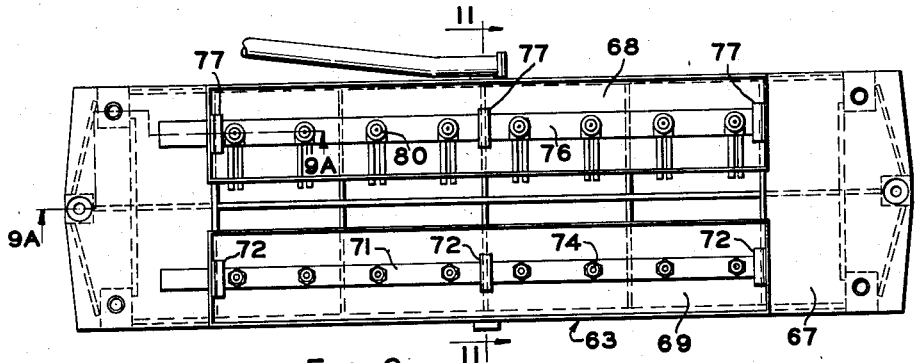
Fig. 9 is a plan view of a lower elevator assembly such as used in the machine shown in Fig. 1.
Figure 10:
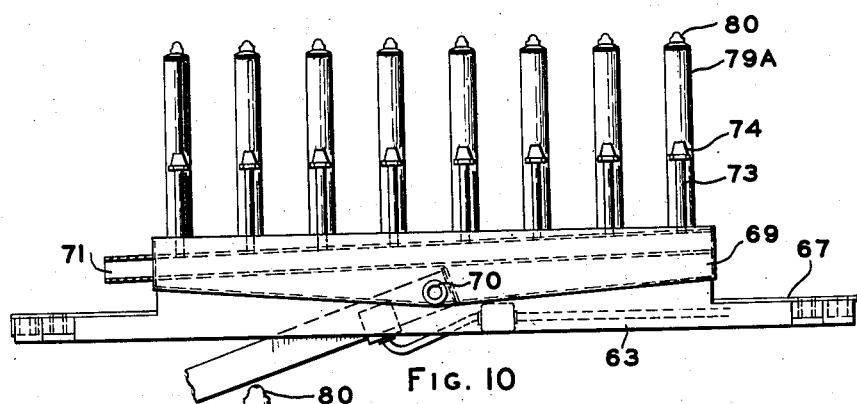
Fig. 10 is a side view of the lower elevator assembly illustrated in Fig. 9.
Figure 11:
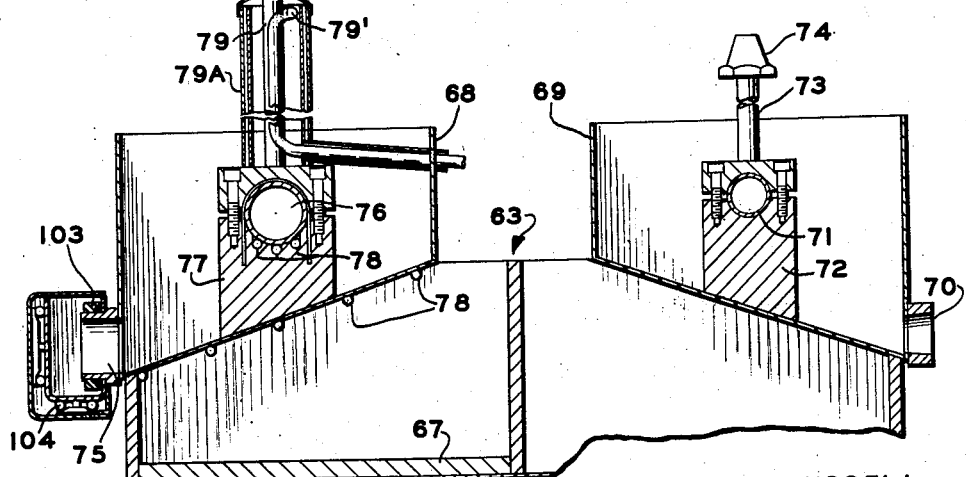
Fig. 11 is a section view taken along the line 11—11 of Fig. 9.

The lower elevator 63 runs on and is guided by four posts 66. As shown best in Figs. 9-11, it includes a platform 67 on which a tin tray 68 and a flux tray 69 are mounted. The flux tray 69 is preferably made of stainless steel and has an angular bottom draining to a central return outlet 70. Centrally mounted in the flux tray 69, there is a conduit or manifold 71 that is supported in three equally spaced bearing support blocks 72. The manifold 71 carries a series of upwardly extending spray pipes 73 that are fitted with spray nozzles 74.

The tin tray 68 may also be made of stainless steel and has an angular bottom draining to a central return outlet 75. Centrally located in the tin tray there is a conduit or manifold 76 that is supported in three bearing blocks 77. Electric heating elements 78 of the resistance type are located beneath the manifold 76 and are secured to the under side of the bottom of the tin tray 68. The heaters 78 beneath the manifold are supported in the bearing blocks 77. A series of upwardly extending spray pipes 79 with nozzles 80 at their ends which are capable of spraying the hot tin are spaced along the manifold 76. The spray pipes 79 also have electrical heaters 79' surrounding them and these heaters are surrounded by protective sheathing 79a to prevent shorting of the heaters.

Figure 4:
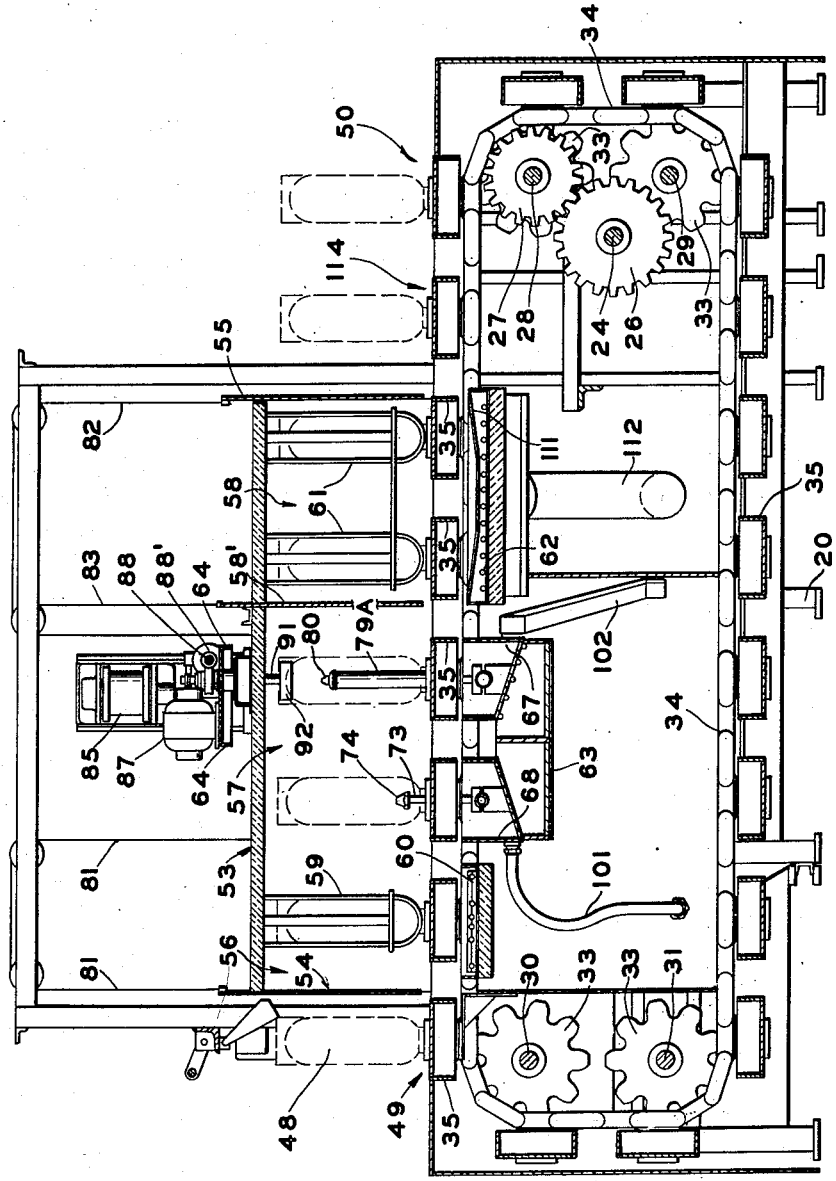
Fig. 4 is a section view taken along the line 4—4 of Fig. 2.

The tin and flux trays 68 and 69 are assembled to the elevator platform 67 and the spray pipes 73 and 79 are spaced on their respective manifolds so that each spray pipe will be in register with one of the openings extending through the rotatable sleeves 42 in the carrier plates 35 that are located at the fluxing and tinning positions in the central zone of the enclosed chamber 53. This permits the spray pipes 73 and 79 to project through the sleeves and into the interior of the containers when the lower elevator is raised as shown in Fig. 4.

As shown best in Fig. 1, the doors 54, 55 and 56' may be automatically raised and lowered at the proper times by connecting them to the lower elevator 63 by cables 81, 82 and 83, respectively. The cables 81, 82 and 83 run over pulleys that are supported on an overhead frame 84. Thus, when the elevator is raised, the doors are lowered, and when the elevator is lowered, the doors are raised.

Figure 12:
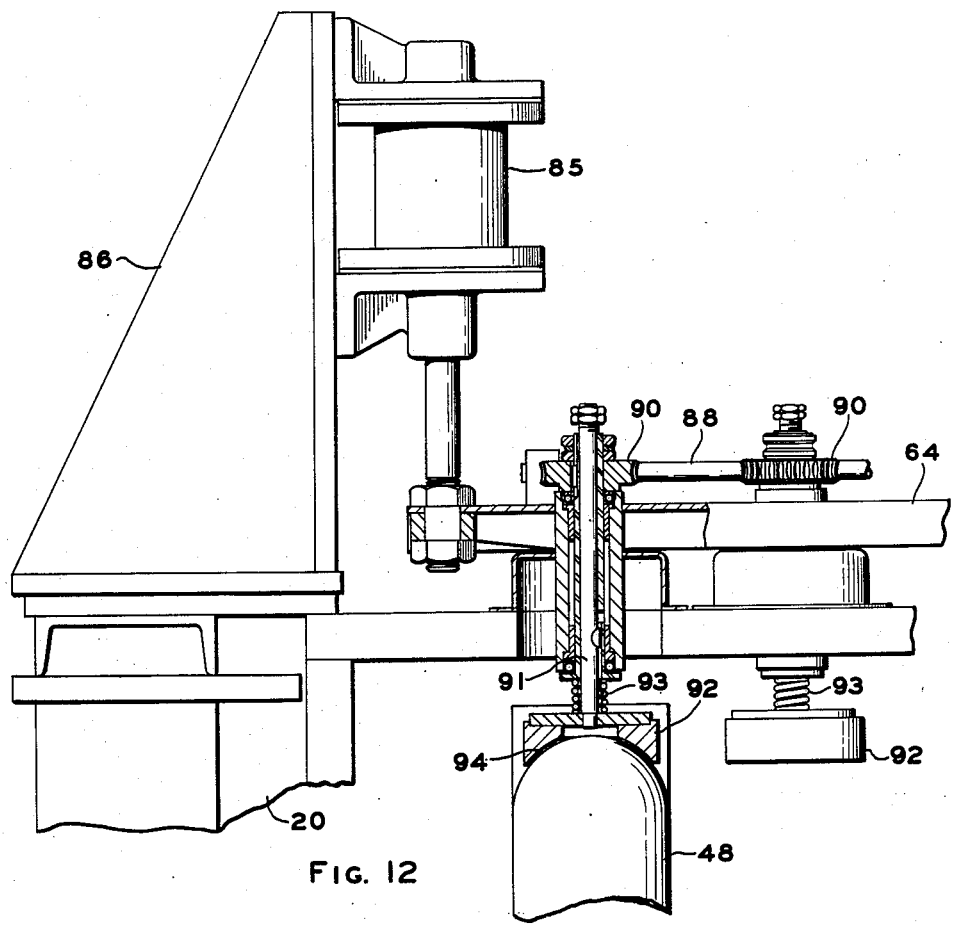
Fig. 12 is a fragmentary view in partial section taken in a vertical plane illustrating certain details of an upper elevator assembly such as used in the machine shown in Fig. 1.
Figure 9A:
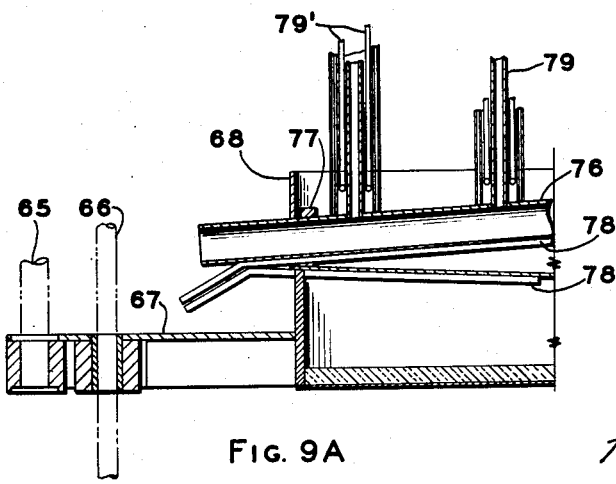
Fig. 9A is a fragmentary view in section taken along the line 9A—9A of Fig. 9.

Now referring to Fig. 12, each end of the upper elevator 64 is connected to a piston of a pneumatically or hydraulically operated, double-acting cylinder 85. The cylinders 85 are secured to angles 86 that are supported on top of the frame 20 at opposite sides thereof. The upper elevator 64 carries an electric motor 87 that drives a line shaft 88 through a worm and wheel connection 88'. Secured at intervals along the line shaft 88 are worms 89 that drive worm wheels 90. The form wheels 90 are secured to vertical shafts 91 that are mounted on the elevator in anti-friction and plain bearings and extend downwardly (see Fig. 12). The vertical shafts 91 each carry a driver 92 that is urged to its downward position by a spring 93. The drivers 93 are lined with a high temperature brake lining 94 and are positioned directly above the tops of the row of containers 48 on the carrier plate 35 that is located at the tinning position of the conveyor. As the lower elevator 63 is raised, the upper elevator 64 is lowered until the spring-backed drivers 92 engage with the tops of the containers 48. The motor 87 then operates the drivers 92 to rotate the containers and the rotatable sleeves 42 at a desired speed as coating material is sprayed on the inside of the containers. This assures even distribution and complete coverage of the coating material over the inside surface of each of the containers.

Figure 13:
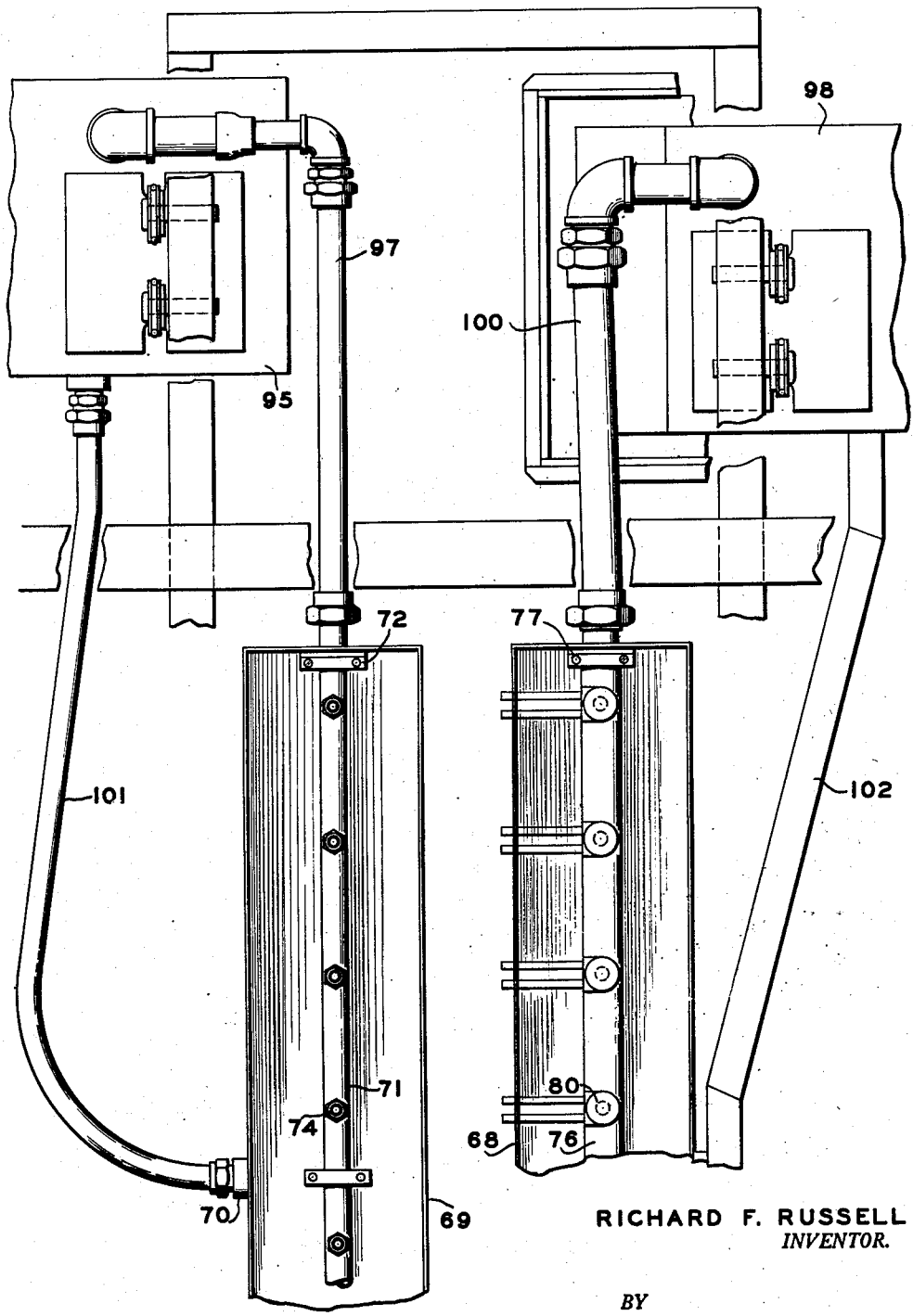
Fig. 13 is a fragmentary plan view illustrating certain details of the tin and flux trays and their connections to tin and flux tanks.

Referring to Fig. 13, flux is delivered under pressure to the manifold 71 in the flux tray 69 from a flux tank 95 by a centrifugal pump 96 through a pipe 97 and molten tin is delivered under pressure to the manifold 76 in the tin tray 68 from a tin tank 98 by a centrifugal pump 99 through a pipe 100. The return outlet 70 from the flux tray 69 is connected through a flexible pipe 101 to the flux tank 95 and the return outlet 75 of the tin tray 68 is connected through a return pipe 102 to the tin tank 98. The tin return pipe 102 makes a swiveled connection at 103 to the return outlet 75 of the tin tray 68 and electrical heating elements 104 (see Fig. 11) of the resistance type are provided for heating this connection and the tin return pipe 102.

Universal connections are also provided for the pressure and discharge pipe leading from and returning to the storage tanks or the source from which the fluid fluxing and coating materials are pumped and the junctions of said pipes are positioned with relation to the movement of the lower elevator so that the ver-sine of the angle of action coincides and provides smooth action of the joint connections. All of the flexible pipes, manifolds, stand pipes and trays for handling the molten coating material are electrically heated by means of electrical heaters of the resistance type which are protectively sheathed to prevent shorting or grounding due to splatter of fluid metal.

Figure 16:
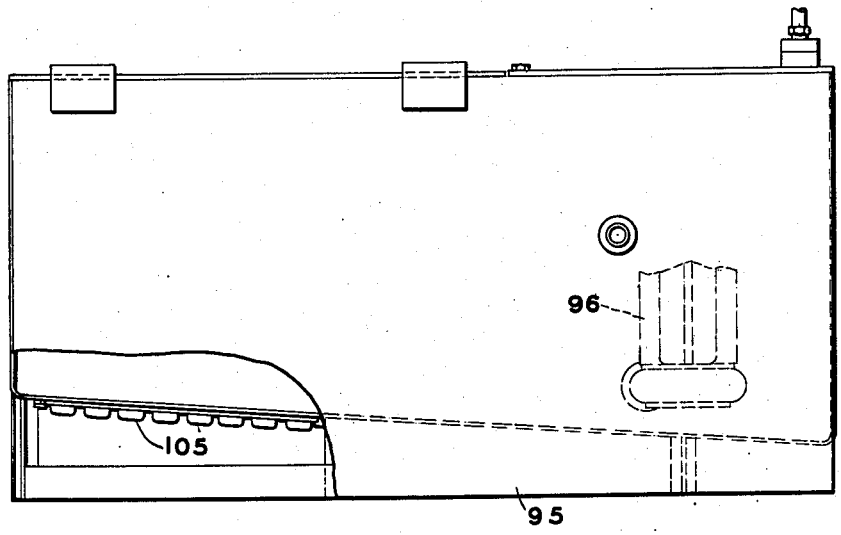
Fig. 16 is a side view in partial section of the flux tank.

The flux tank 95 and the tin tank 98 are mounted at one side of the frame 20, as seen in Fig. 2, and they both may be of suitable materials to resist corrosion. The flux tank 95 is provided with electric strip heaters 105 (see Fig. 16) that are automatically regulated by thermostats to maintain the flux bath at a predetermined temperature which in the illustrated embodiment is in the neighborhood of 180° F. The flux pump 96 has a self-contained motor 96' that drives a volute pump of a suitable size to provide a flushing action of the flux bath and the working portions of the pump are preferably of Monel metal. The flux tank is also equipped with suitable strainers to prevent extraneous material from entering the line and is completely enclosed and insulated to prevent heat losses.

Figure 17:
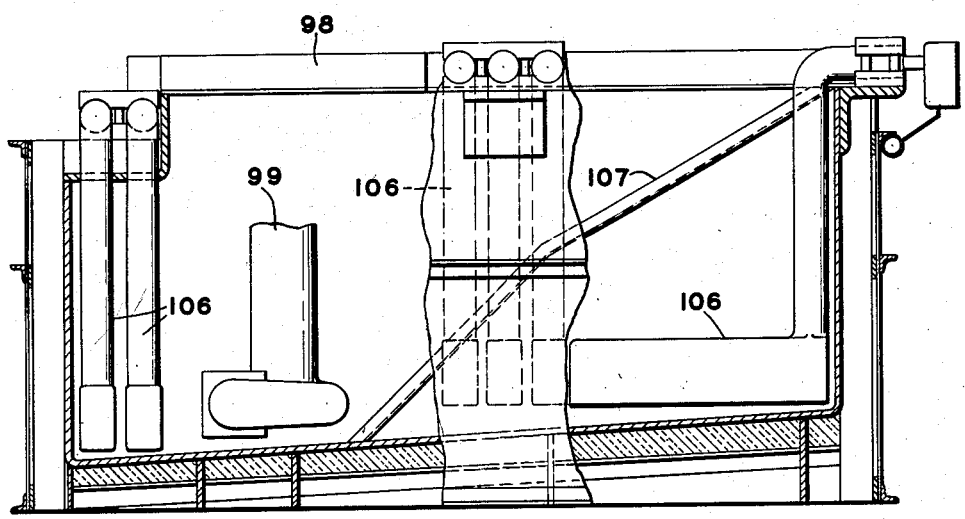
Fig. 17 is a side view in partial section of the tin tank or furnace.

The tin tank 98 (see Fig. 17) not only serves as a storage reservoir for the molten tin, but also serves as a furnace for melting the tin or other coating material. It contains immersion electric heaters 106 that are of sufficient capacity to melt pig metal and at the same time maintain the constant temperature required to keep the metal in the tank in a molten or fluid condition. The tin tank is heavily insulated to prevent heat loss and is especially designed to serve as a melting furnace to which metal in pig form may be fed directly and melted for use in the apparatus. It is equipped with an ingot feeding slide 107 and screens for controlling dross. The tin pump 99 has a self-contained motor 99' that drives a volute pump of a suitable capacity for the pumping of the heavy fluid metal and its working portions may be of stainless steel.

Figure 14:
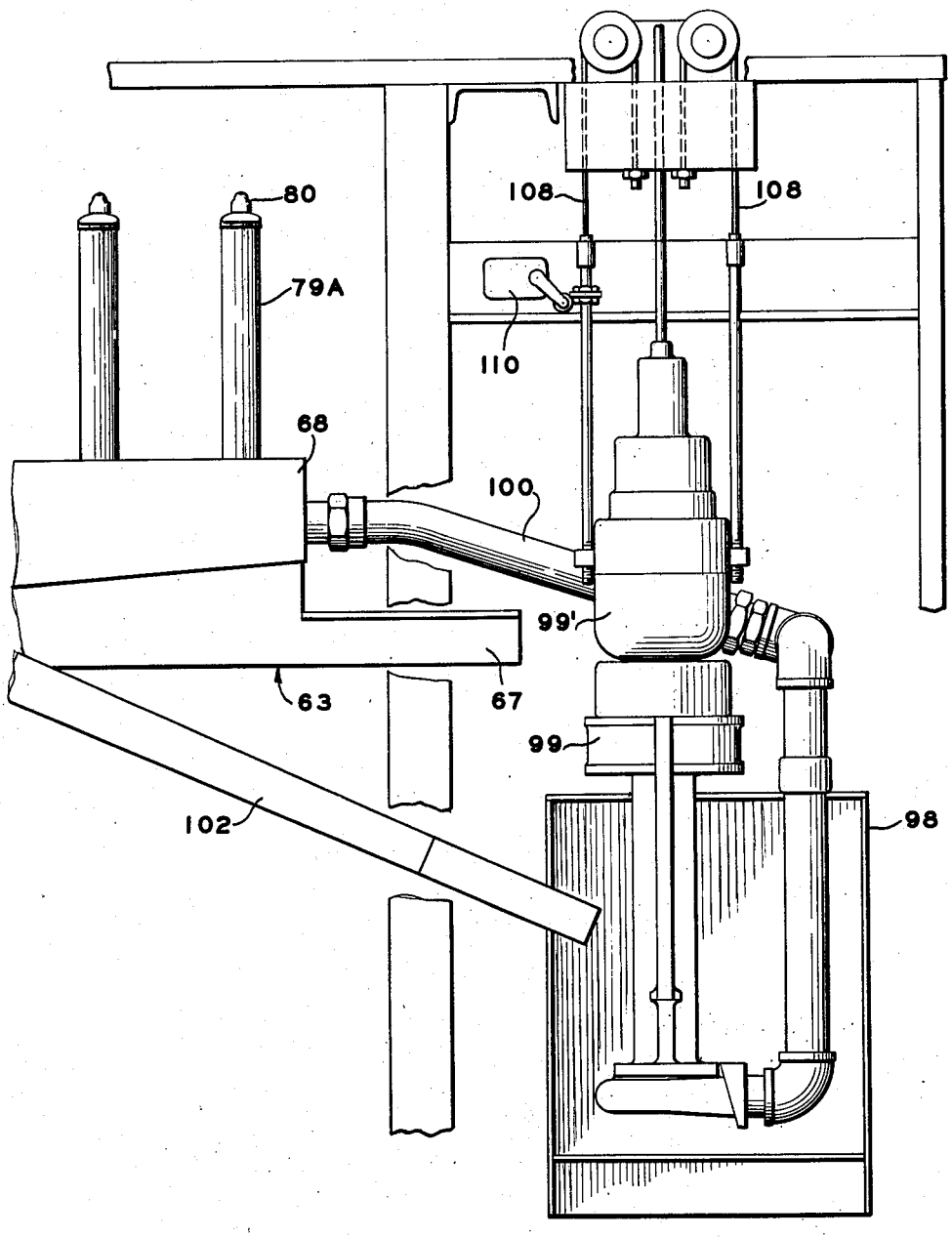
Fig. 14 is a side view taken from the right of the parts illustrated in Fig. 13.
Figure 15:
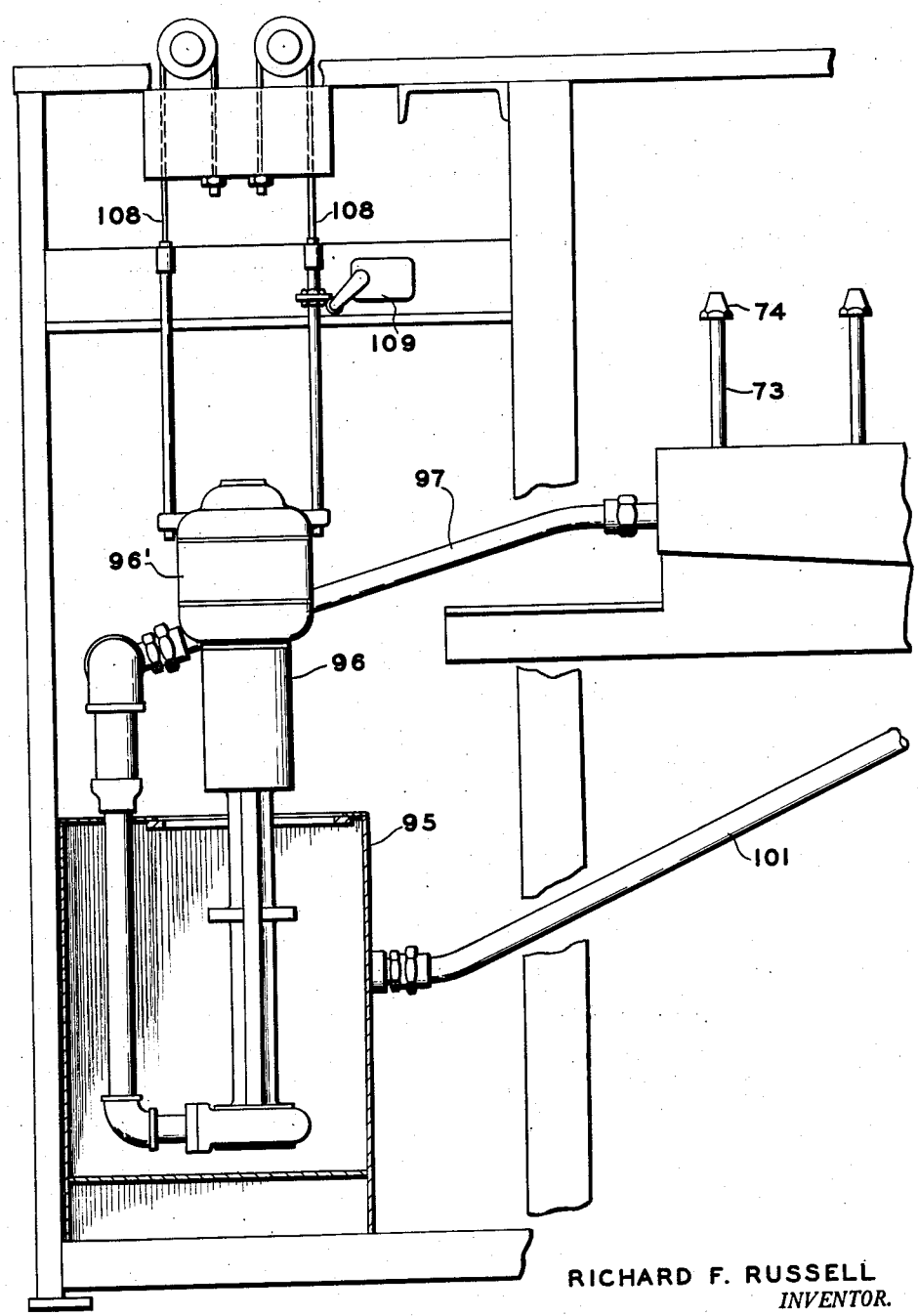
Fig. 15 is a side view taken from the left of the parts illustrated in Fig. 13.

The motor driven flux and tin pumps 96 and 99 are water cooled and each may be raised out of or lowered into its respective tank 95 or 98 by cables 108 (see Figs. 14 and 15). The water cooling systems have solenoid operated valves and the raising or lowering of the pumps 96 and 99 operates limit switches 109 and 110, respectively, that permit the pumps to be operated only when the pumps are lowered into pumping position in their respective tanks and also turn on the cooling water as soon as the pumps are lowered into their respective tanks.

The heat treatment zone 58, into which the containers pass after coating material has been applied to their inside surfaces, accommodates two of the carrier plates 35 with containers 43 supported thereon. However, the heat treatment zone may be made either longer or shorter, as desired so that the time and temperature of the heat treatment to which the containers are subjected will be as required.

Figure 8:
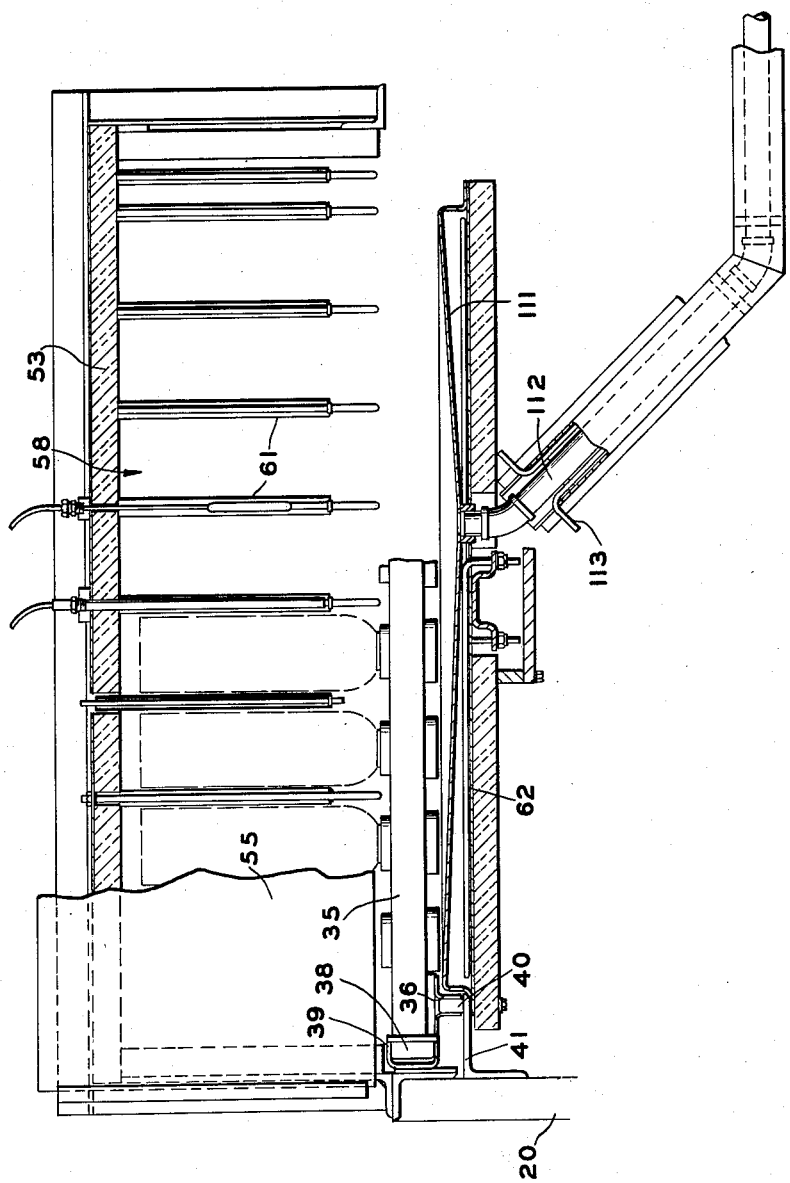
Fig. 8 is a fragmentary view in partial section taken in a vertical plane illustrating certain details of the heat treating chamber of the machine shown in Fig. 1.

The containers in the heat treatment zone 58 are supported in inverted position over a drain pan 111 that receives the excess coating material as it drains from the containers. The drain pan 111 is located immediately above the heating elements 62 on the floor of the heat treatment zone 58 (see Figs. 4 and 8) and the excess coating material that is collected in the drain pan 111 is returned to the tin tank 98 by a drain pipe 112 that is heated by electrical heating elements 113.

When the containers leave the heat treatment zone 58, they may be stopped at a cooling position of the conveyor, as indicated at 114, for one operation of the machine before proceeding to the unloading station 50. This permits the containers to cool sufficiently so that they may be handled and removed from the carrier plates 35 when they reach the unloading station 50.

In starting the machine, a loaded carrier plate has to reach the point in the central zone where a row of containers is in position to receive the coating material before the operation of the machine may be made entirely automatic. For this reason, provision is made to permit the conveyor to be advanced as the carrier plates are loaded by manual controls and provision is also made for fully automatic operation. In the manual operation of the machine, the flux pump and the tin pump may be placed in operation at appropriate times as containers reach the fluxing position and the tinning positions, respectively.

Figure 18:
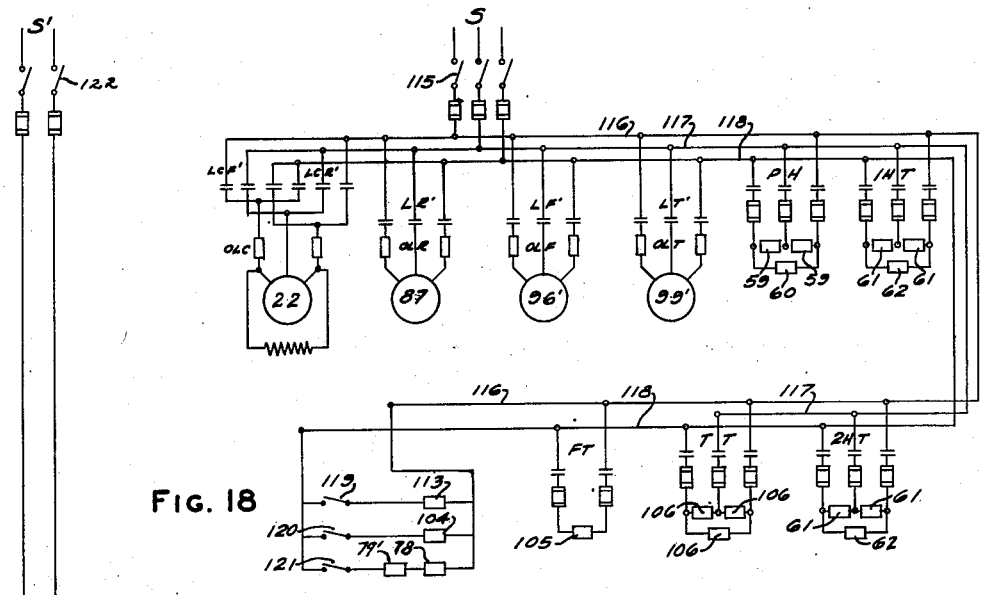
Fig. 18 is a schematic wiring diagram for the operating parts of the machine shown in Fig. 1.
Figure 19:
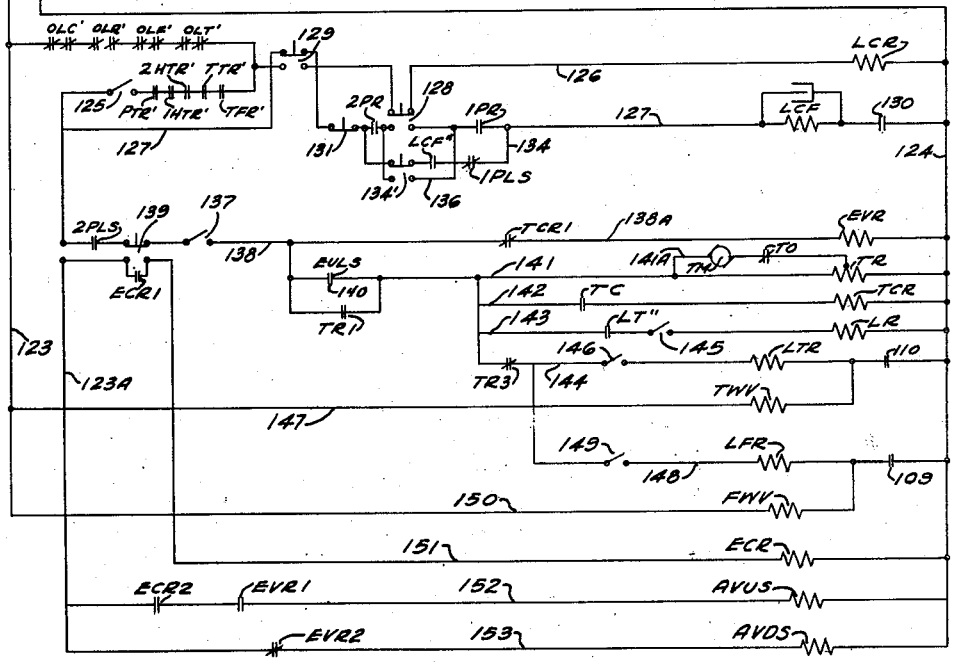
Fig. 19 is a schematic wiring diagram of a control circuit for the machine shown in Fig. 1.

A main circuit and a control circuit suitable for operating the machine which has just been described are illustrated schematically in Figs. 18 and 19 (in simplified form). In the main circuit, Fig. 18, a switch 115 connects power lines 116, 117 and 118 to a source of electrical energy S, in this case a three phase system, that is suitable for operating the various working parts of the machine such as motors and heaters. The control circuit, Fig. 19, controls the operation of the working parts in proper timed relation to the operation of the machine.

In the main circuit, Fig. 18, the conveyor motor 22, the work rotating motor 87, the flux pump motor 96' and the tin pump motor 99' are respectively connected to the power lines 116, 117 and 118 through suitable protective devices such as overload relays, indicated at OLC, OLR, OLF and OLT, and these relays may also be interconnected so that when the contacts of any one of the overload relays open, the contacts of the other relays will also open and the operation of all of the motors will be stopped.

The conveyor motor 22 is connected to drive the conveyor forward when relay controlled contactors LCF are closed and in reverse when relay controlled contactors LCR are closed. The work rotating motor 87, the flux pump motor 96' and the tin pump motor 99' are respectively connected to the power lines 116, 117 and 118 by relay controlled contactors LR, LF and LT. The heaters 59 and 60 in the preheat zone, the heaters 61 in the two positions of the heat treating zone, the heaters 106 in the tin tank and the heaters 105 in the flux tank are respectively connected to the power lines by relay controlled contactors P, 1HT and 2HT, TT, FT. The tin line heaters 113 and 104 and the tin tray and tin manifold and stand pipe heaters 78 and 79' are respectively connected to the power lines 116 and 118 through thermostatically controlled switches 119, 120 and 121.

In the control circuit, Fig. 19, a manually operable switch 122 connects the control power lines 123 and 124 to a source of electrical energy S' that is suitable for operating the various control relays. A power line 123a (to which a number of the controls are connected) is connected to the power line 123 through normally open, thermostatically controlled, relay operated contacts PTR, 1HTR, 2HTR, TTR, FTR and normally closed relays controlled contacts OLC', OLR', FOL' and TOL'. The relays controlling the contacts PTR, 1HTR, 2HTR, TTR and FTR are operated by thermostats located in the preheat zone, in the heat treating zone (2 positions), the tin tank and the flux tank, respectively, to close these contacts when the required temperatures in the heating zones and in the flux and tin tanks have been reached. Thus, the machine cannot operate until all of these contacts have been closed. The contacts COL', ROL', FOL' and TOL' are normally closed and are opened when any one of the overload relays in the main circuit opens.

A manually operable safety switch 125 is also connected in the line 123a and is located at a position on the machine where it can be conveniently reached by the operator of the machine so that the operator can stop all further operation of the machine by opening this switch.

The controls for the conveyor motor are connected to the power lines 123a and 124 through lines 126 and 127 (horizontal) and manually operable momentary push button switches 128 and 129. When the push button switches 128 and 129 are in the position shown, the line 126 connects the relay LCR to the power lines 123a and 124 when the push button switch 129 is depressed and causes the conveyor to be driven in reverse.

When the push button 128 is depressed momentarily, a conveyor motor relay LCF is connected by the line 127 to the power lines 123a and 124 and closes the contactors LCF' for operating the conveyor in a forward direction. The line 127 includes a pair of photo-electric relay contacts 1PR and 2PR, a limit switch 130 and a conveyor stop switch 131. Line 134 parallels the circuit of line 127, through the switch 128 and the contacts 1PR and 2PR. Line 134 includes a push button switch 134', normally open contacts LCF'' and normally open contacts 1PLS of a conveyor position limit switch 135 (see Fig. 1). The contacts LCF'' are closed by the relay LCF when push button 128 is momentarily depressed and the conveyor continues to run forward until it trips the position limit switch 135 and opens its contacts 1PLS which occurs when the conveyor has advanced one step.

The conveyor may be inched forward or in reverse by depressing the push button switches 134' or 129, respectively. When the push button switch 134' is depressed, it by-passes switch 128 through line 136 momentarily.

The photo-electric relays controlling the contacts 1PR and 2PR are operated by photo-electric cells (not shown) located at the loading and unloading stations 49 and 50 of the machine, respectively. The photo-electric cell, operating the relay that controls the contacts 1PR, is located at the loading station and is arranged so that a flag 132 located above each container at the loading station (see Figs. 3 and 4) must be raised by a container being placed on the carrier plate at the appropriate position to move the flag out of a beam of light that is focused on the photo-electric cell. When a container has been placed at each position on the carrier plate at the loading station, all of the flags 132 are raised and the beam of light strikes the photo-electric cell causing the contacts 1PR to be closed.

The photo-electric cell, operating the relay that controls the contacts 2PR, is located at the unloading station and a beam of light focused on it is blocked by any container remaining at any position on the carrier plate at that station and the contacts 2PR are held open. When all of the containers have been removed from the carrier plate at the unloading station, the photo-electric relay controlling the contacts 2PR operates to close these contacts.

In this manner, the photo-electric relays through their contacts 1PR and 2PR permit the conveyor motor to be operated to move the conveyor forward only after a container has been put in place at every position of the carrier plate at the loading station and all of the containers have been removed from the carrier plate at the unloading station. Also, the arrival of a loaded carrier plate at the loading station and an empty carrier plate at the loading station automatically causes the conveyor motor to be stopped after the conveyor limit switch contacts 1PLS have been opened.

The control circuits for the upper and lower elevators and the tin and flux pumps are placed in operation at proper times by closing a manually operable switch 137 in line 138. In line 138, the switch 137 is connected in series with a manually operable push button switch 139 and a conveyor position limit switch contacts 2PLS to the power line 123a. The line 138a connects the switch 137 through timer controlled relay contacts TCR1 and an elevator valve opening relay EVR to the power line 124.

Connected in parallel with the line 138a through either contacts EULS of an upper limit switch 140 that is operated by the lower elevator (see Fig. 1) or normally open contacts TR1 of a cycle timing relay are lines 141, 142, 143 and 144.

The line 141 is connected to the power line 124 through a cycle timing relay TR. The normally closed time-delayed opening contacts TO of the cycle timing relay TR and a timer motor TM are connected across the timing relay TR by the line 141a.

The line 142 connects the timer control relay TCR to the power lines through the time delayed closing contacts TL that are closed by the operation of the cycle timing relay TR. The line 143 connects the work rotating relay LR to the power lines through a manually operable switch 145 and contactors LT'' that are controlled by the tin pump relay LT.

The tin pump relay LTR, which controls the tin pump motor contactors LT, is connected to the power lines by line 144 through the tin pump limit switch 110 (TLS), a manually operable switch 146, and normally closed contacts TR3 of the cycle timing relay TR. The tin pump water valve solenoid TWV is also connected through the tin pump limit switch 110 (TLS) to the power line 124 and to the power line 123 by line 147 so that this valve is opened as soon as the tin pump is lowered into the tin tank.

The flux pump relay LFR which controls the flux pump motor contactors LF is connected to the power lines by the line 148 through normally closed cycle timer relay contacts TR3, a manually operable switch 149 and the flux pump limit switch 109 (FLS). The flux pump water valve solenoid FWV is connected to the power line 124 through the flux pump limit switch 109 and to the power line 123 by line 150.

An elevator control relay ECR is connected to the power lines 124 and 123a by the line 151 through either the normally open elevator control relay contacts ECR1 or by depressing the push button switch 139. A valve operating solenoid AVUS that is operated to shift the elevator control valve for the elevator operating cylinders when the elevator reaches its up position, is connected to the power lines 124 and 123a by line 152 in which normally open contacts EVR1 that the closed by the elevator relay EVR and normally open contacts ECR2 that are closed by the elevator control relay ECR are located. A second valve operating solenoid AVDS that is operated to shift the elevator cylinder control valve when the elevator reaches its down position, is connected to the power lines 124 and 123a by line 153 through normally closed elevator relay contacts EVR2 that are opened by operation of the elevator relay EVR.

Summarizing, the machine may be started after the preheat and heat treating zones and the flux and tin tanks, respectively, have reached their proper operating temperatures, by manually lowering the flux and tin pumps into their respective tanks. When the pumps are in this position, they close the limit switches 109 and 110 in the control circuits which turn on the cooling water to the pumps and the cooling water remains on at all times while the pumps are in their respective tanks. The limit switches also close the control circuits to the pump motors so that they may be operated at appropriate times.

The operator then loads the carrier plate at the loading station by placing a container in inverted position on each of the rotatable sleeves. When the last container is placed on the carrier plate, it clears the photo-electric relay which operates to close the contacts 1PR. The operator then closes the conveyor start switch 128 and the conveyor moves one position bringing the loaded carrier plate into the preheat zone and the next carrier plate to the loading station. This operation is repeated and the first carrier plate advances to the fluxing position.

In order to flux but not tin when the elevator is raised, the elevator control switch 137 and the switch 149 controlling the flux pump relay is closed. This causes the elevator to be raised and the timer and flux pump go through their required cycle upon completion of which the elevator returns to its down position, but the conveyor does not move. During this period, the third carrier plate has been loaded and the conveyor may then be advanced at the proper time by closing the manual switch 128 to bring the first loaded carrier plate to the tinning position.

The fourth carrier plate is now loaded and the switches 145 and 146 in the work rotating motor and tin pump motor control circuits are closed. This places the machine in condition for full automatic operation. The machine may then be operated by automatic controls and may continue to operate on an automatic cycle until stopped by the operator or a failure such as would cause the opening of an overload relay.

When the switches 137, 145, 146 and 149 have been closed, the machine may be automatically operated. Under these conditions, the normally closed contacts of the position limit switch 135 are opened by the conveyor after it has moved one position. This stops the conveyor and the valves controlling the operation of the elevator pistons 65 and 85 are then operated to cause the lower elevator 63 to rise and the upper elevator 64 to descend. When the lower elevator 63 has risen to its top station, it closes the normally open contacts of the upper limit switch 140 which causes the flux and tin pumps 96 and 99 and the work rotating motor 87 to operate. The operation of these units is under the control of a timer. When the timer times out, the operation of the flux and tin pumps and the work rotating motor ceases and the valves for the elevator operating pistons are shifted causing the upper elevator to rise and permitting the lower elevator to descend.

When the lower elevator reaches its lower position, it closes the normally open contacts of the lower limit switch 139 and places the conveyor in condition to be advanced one position when all of the containers have been placed on it at the loading station and have been removed from it at the unloading station. The conveyor may then be advanced one position by closing the push button switch 128. For fully automatic operation, a timing relay that is placed in operation at an appropriate time, may be provided to close contacts in parallel with the contacts of the push button switch 128 for operating the conveyor motor at the proper time. When the conveyor moves forward to its next position, the cycle of operations is automatically repeated. During the time that the conveyor remains at one position, the containers in the preheating zone 56 and the heat treatment zone 58 are heated to the proper temperatures as required.

It will be understood that various changes and modifications may be made in the embodiment of the invention illustrated and described herein without departing from the scope of the invention as described by the following claims.

I claim:

1. A machine for applying a protective coating of material such as tin to the inside of a metal container such as a fire extinguisher shell which includes, a conveyor of the continuous type, said conveyor being movable step by step along a horizontal path to a plurality of work positions, rotatable members carried by said conveyor for supporting containers in inverted position at spaced intervals along said conveyor, each of said rotatable container supporting members having an opening extending therethrough and communicating with the interior of the container supported thereon, vertically reciprocable elevator, means carried by said elevator for simultaneously applying a flux to the inside of a container at one position on the conveyor and a coating of protective material to a container at the next position on the conveyor, said last-mentioned means including a pair of upwardly extending stand pipes spaced from each other, the first of said pipes having a spray head at its end and being positioned beneath and in alignment with opening in the container supporting member at the first of said positions of the conveyor and the second of said pipes being heated and having a nozzle at its end, said heated pipe being positioned beneath and in alignment with the opening in the container supporting member at the second of said positions of the conveyor, said stand pipes extending through the openings in the respective container supporting members and into the interior of the containers supported thereon when the elevator is in its raised position and means for rotating the container at the second of said positions, said rotating means being located above the container at said second position and being vertically reciprocable into and out of rotating engagement with said container, a heating chamber through which the container passes in its movement by the conveyor, said heating chamber being located at a position in advance of the flux applying position of the conveyor, and a second chamber through which the container passes in the movement of the conveyor, said second chamber being located at a position after the coating applying position of the conveyor.

2. A machine for applying a protective coating of material such as tin to the inside of a metal container such as a fire extinguisher shell which includes, a conveyor of the continuous type, said conveyor being movable step by step along a horizontal path to a plurality of work positions, rotatable members carried by said conveyor for supporting containers in inverted position at spaced intervals along said conveyor, each of said rotatable container supporting members having an opening extending therethrough and communicating with the interior of the container supported thereon, vertically reciprocable elevator located beneath the horizontal path of the conveyor, means carried by the elevator means for simultaneously applying a flux to the inside of a container at one position on the conveyor and a coating of protective material to a container at the next position on the conveyor, said last-mentioned means including a pair of spaced, upwardly extending stand pipes having nozzles at their ends, the first of said pipes being positioned beneath and in alignment with the opening in the container supporting member at the first of said positions of the conveyor and the second of said pipes being positioned beneath and in alignment with the opening in the container supporting member at the second of said positions of the conveyor, said stand pipes extending through the openings in the respective container supporting members and into the interior of the containers supported thereon when the elevator is in its raised position, means for rotating the container at the second of said positions, said rotating means being located above the container at said second position and being vertically reciprocable into and out of rotating engagement with said container, a heated tank containing a supply of a fluxing material, means communicating with the first stand pipe and the flux tank for supplying fluxing material to said first pipe under pressure, a heated tank containing a supply of coating material in a fluid state and means communicating with the second stand pipe and the supply of coating material for supplying fluid coating material to said second pipe under pressure.

3. A machine for applying a protective coating of material such as tin to the inside of a metal container such as a fire extinguisher shell as defined in claim 2 which includes heaters for heating the second of said stand pipes and the means connecting said second pipe to the tin tank.

4. A machine for applying a protective coating of material such as tin to the inside of a metal container such as a fire extinguisher shell which includes, a conveyor of the continuous type, said conveyor being movable step by step along a horizontal path to a plurality of work positions, rotatable members carried by said conveyor for supporting containers in inverted position at spaced intervals along said conveyor, each of said rotatable container supporting members having an opening extending therethrough and communicating with the interior of the container supported thereon, vertically reciprocable elevator located beneath the horizontal path of the conveyor, means carried by the conveyor for simultaneously applying a flux to the inside of a container at one position on the conveyor and a coating of protective material to a container at the next position on the conveyor, said last-mentioned means including a pair of spaced, upwardly extending stand pipes having nozzles at their ends, the first of said pipes being positioned beneath and in alignment with the opening in the container supporting member at the first of said positions of the conveyor and the second of said pipes being positioned beneath and in alignment with the opening in the container supporting member at the second of said positions of the conveyor, said stand pipes extending through the openings in the respective container supporting members and into the interior of the containers supported thereon when the elevator is in its raised position, means for rotating the container at the second of said positions, said rotating means being located above the container at said second position and being vertically reciprocable into and out of rotating engagement with said container, a heated tank containing a supply of a fluxing material, means communicating with the first stand pipe and the flux tank for supplying fluxing material to said pipe under pressure, a heated tank containing a supply of coating material in a fluid state, heated means communicating with the second stand pipe and the supply of coating material for supplying fluid coating material under pressure to said pipe and heating means for heating a coated container at a position of the conveyor following the coating position of the conveyor.

5. A machine for applying a protective coating of material such as tin to the inside of a metal container such as a fire extinguisher shell as defined in claim 4 which includes heated means located beneath the container during said last-mentioned heating for collecting coating material drained from said container, said last-mentioned means having connections to the tin tank.

6. In an apparatus for applying a coating of protective material simultaneously to the interiors of a plurality of containers, the combination of means for rotatably supporting a row of containers in inverted position and in spaced relation to each other, intermittently operated conveyor means for moving successive rows of said containers sequentially to a plurality of positions in a step by step movement, heating means for preheating a row of the containers at one of said positions, means for applying flux to the interiors of a row of preheated containers at another of said positions, means for applying a coating of protective material to the interiors of a row of fluxed containers at still another of said positions and independently motor driven means for rotating each container of the row at said last-mentioned position as the coating material is applied to the interior thereof.

7. In an apparatus for applying a coating of protective material simultaneously to the interiors of a plurality of containers, the combination of means for rotatably supporting a row of containers in inverted position and in spaced relation to each other, intermittently operated conveyor means for moving successive rows of said containers sequentially to a plurality of positions in a step by step movement, means for preventing operation of the conveyor until a container is placed in inverted position on the rotatable supporting means at each position in a row at an initial position of the conveyor means, heating means for preheating one row of the containers at a position of the conveyor following said initial position, means for applying flux to the interiors of a row of preheated containers at subsequent positions of the conveyor, means for applying a coating of protective material to the interiors of a row of fluxed containers at a position of the conveyor subsequent to said fluxing position and independently motor driven means for rotating the containers of the row at said last-mentioned position as the coating material is applied to the interiors thereof.

8. In an apparatus for applying a coating of protective material to the interior of a metal container and heat-treating the container to relieve stresses in the metal thereof, the combination of means for rotatably supporting a series of containers in inverted position and in spaced relation to each other, intermittently operated conveyor means for moving said inverted containers sequentially in step by step movement to a plurality of positions, heating means at a first of said positions for heating the container at said position, means at a second of said positions for applying a flux to the interior of the container at said second position, means at a third of said positions for applying a coating of protective material to the interior of the container at said third position, independently motor driven means for rotating the container at said third position simultaneously with the applying of coating material thereto and heater means located at at least one position following said third position for heating the container at said last-mentioned position.

9. In an apparatus for applying a coating of protective material to the interior of a metal container and heat-treating the container to relieve stresses in the metal thereof, the combination of means for rotatably supporting a series of containers in inverted position and in spaced relation to each other, intermittently operated conveyor means for moving said inverted containers sequentially in step by step movement to a plurality of positions, heating means at a first of said positions for heating the container at said position, means at a second of said positions for applying a flux to the interior of the container at said second position, means at a third of said positions for applying a coating of protective material to the interior of the container at said third position, independently motor driven means for rotating the container at said third position simultaneously with the applying of coating material thereto, heater means located at at least one position following the third position for heating the container at said last-mentioned position, and means for collecting excess coating material from the inverted container at the last-mentioned position.

10. In an apparatus for applying a coating of protective material simultaneously to the interior of a plurality of metal containers and heat-treating said containers, the combination of means for rotatably supporting a series of containers in a row and in inverted position, intermittently operated conveyor means for moving successive rows of the inverted containers sequentially to a series of positions in step by step movement, heating means for preheating the containers in one row at one of said positions, means for applying a flux to the interiors of a row of preheated containers at a second of said positions, means for applying a coating of protective material to the interiors of a row of fluxed containers at a third of said positions, independently motor driven means for rotating the containers of the row at said last-mentioned position and heating means for heating the rows of the coated containers at a plurality of positions thereof following said third position of the conveyor.

11. In a machine for applying a coating material to the interior of a container, the combination of a pair of oppositely disposed conveyors of the continuous type, said conveyors being intermittently movable in step by step movement to a plurality of positions, a series of carriers extending between the conveyors and carried thereby, said carriers being spaced relative to each other on the conveyors and each having a series of spaced openings therein, means for supporting a series of containers in inverted position on the carriers above each of the openings therein and a series of vertically reciprocable stand pipes having nozzles at the ends thereof located beneath one of the carriers at one position of the conveyor, one of said stand pipes being aligned with each of the openings in said carrier and extending through said opening into the interior of the container when said pipes are in a raised position.

12. In a machine for applying a coating material to the interior of a container, the combination of a pair of oppositely disposed conveyors of the continuous type, said conveyors being intermittently movable in step by step movement to a plurality of positions, a series of carriers extending between the conveyors and carried thereby, said carriers being spaced relative to each other on the conveyor and each having a series of spaced openings therein, means for rotatably supporting a series of containers in inverted position on the carriers above each of the openings therein, a series of vertically reciprocable stand pipes having nozzles at the ends thereof located beneath one of the carriers at one position of the conveyor, one of said stand pipes being aligned with each of the openings in said carrier and extending through said opening into the interior of the container when said pipes are in a raised position, and vertically reciprocable container rotating means positioned above the containers at said position of the conveyor, said rotating means engaging with the bottom of each of the containers at its lowered position.

13. In a machine for heat treating and applying a coating material to the interior of a metal container, the combination of a pair of oppositely disposed conveyors of the continuous type, said conveyors being intermittently movable in step by step movement to a plurality of positions, a series of carriers extending between the conveyors and carried thereby, said carriers being spaced relative to each other on the conveyors and each having a series of spaced openings therein, means for supporting a series of containers in inverted position on the carriers above each of the openings therein, a series of vertically reciprocable stand pipes having nozzles at the ends thereof located beneath one of the carriers at one position of the conveyor, one of said stand pipes being aligned with each of the openings in said carrier and extending through said opening into the interior of the container when said pipes are in a raised position, and a heating chamber through which the containers pass in their movement by the conveyor prior to reaching said position of the conveyor.

14. In a machine for heat treating and applying a coating material to the interior of a metal container, the combination of a pair of oppositely disposed conveyors of the continuous type, said conveyors being intermittently movable in step by step movement to a plurality of positions, a series of carriers extending between the conveyors and carried thereby, said carriers being spaced relative to each other on the conveyors and each having a series of spaced openings therein, means for supporting a series of containers in inverted position on the carriers above each of the openings therein, a series of vertically reciprocable stand pipes having nozzles at the ends thereof located beneath one of the carriers at one position of the conveyor, one of said stand pipes being aligned with each of the openings in said carriers and extending through said opening into the interior of the container when said pipes are in a raised position, a heating chamber through which the containers pass in their movement by the conveyor prior to reaching said position of the conveyor, and a second heating chamber through which the containers pass in their movement by the conveyor after leaving said position of the conveyor.

15. A machine for applying a protective coating of material such as tin to the inside of a metal container such as a fire extinguisher shell which includes, a conveyor of the continuous type, said conveyor being movable step by step to a plurality of work positions located along a horizontal path of the conveyor, rotatable members carried by said conveyor for supporting containers in inverted position at spaced intervals along said conveyor, each of said rotatable container supporting members having an opening extending therethrough and communicating with the interior of the container supported thereon, vertically reciprocable means for simultaneously applying a flux to the inside of a container at one position of the conveyor and a coating of protective material to a container at the next position of the conveyor, said last-mentioned means including a pair of upwardly extending stand pipes spaced from each other, the first of said pipes having a spray head at its end and being located beneath and in alignment with the opening in the container supporting member at the first of said positions of the conveyor and the second of said pipes having a nozzle at its end and being located beneath and in alignment with the opening in the container supporting member at the second of said positions of the conveyor, said stand pipes extending through the openings in the container supporting members at the respective positions of the conveyor and into the interior of the containers supported thereon when the vertically reciprocable means is in its raised position, means for heating said second pipe and means for rotating the container at the second of said positions, said rotating means being located above the container at said second position and being vertically reciprocable into and out of rotating engagement with said container.

16. A machine as defined in claim 15 for applying a protective coating of material such as tin to the inside of a metal container such as a fire extinguisher which includes means for automatically advancing the conveyor in a step by step movement and for vertically reciprocating the means for applying the flux and coating material and the rotating means between their raised and lowered positions at periods between the step by step movements of the conveyor and means for preventing movement of the conveyor until a container has been placed on one of the rotatable container supporting members at a position of the conveyor in advance of the first-mentioned positions.

17. A machine as defined in claim 15 for applying a protective coating of material such as tin to the inside of a metal container such as a fire extinguisher which includes means for automatically advancing the conveyor in a step by step movement and for vertically reciprocating the means for applying the flux and coating material and the rotating means between their raised and lowered positions at periods between the step by step movements of the conveyor and means for preventing movement of the conveyor until a container has been placed on one of the rotatable container supporting members at a position of the conveyor in advance of the first-mentioned position and a container has been removed from one of the rotatable container supporting members at a position of the conveyor after the spraying of the coating material on the inside of the container.

18. A machine for applying a protective coating of material such as tin to the inside of a metal container such as a fire extinguisher shell which includes, a conveyor of the continuous type, said conveyor being movable step by step along a horizontal path to a plurality of work positions, rotatable members carried by said conveyor for supporting containers in inverted position at spaced intervals along said conveyor, each of said rotatable container supporting members having an opening extending therethrough and communicating with the interior of the container supported thereon, vertically reciprocable elevator means carried by said elevator for simultaneously applying a flux to the inside of a container at one of the work positions of the conveyor and a coating of protective material to a container at the next work position of the conveyor, said last-mentioned means including a pair of upwardly extending stand pipes spaced from each other, the first of said pipes having a spray head at its end and being positioned beneath and in alignment with opening in the container supporting member at the first of said positions of the conveyor and the second of said pipes having a nozzle at its end and being positioned beneath and in alignment with the opening in the container supporting member at the second of said positions of the conveyor, said stand pipes extending through the openings in the respective container supporting members and into the interior of the containers supported thereon when the elevator is in its raised position, heating elements associated with said second pipe for maintaining the coating material in a fluid condition, means for rotating the container at the second of said positions, said rotating means being located above the container at said second position and being vertically reciprocable into and out of rotating engagement with said container and a heating chamber through which the container passes in its movement by the conveyor, said heating chamber being located at a position in advance of the flux applying position of the conveyor.

19. The method of applying a protective coating of tin to the interior of a metal container comprising the steps of rotatably supporting a container in an inverted position and then bodily moving the inverted container in step by step movement to a plurality of work positions, preheating the container at the first of said work positions, then applying a flux to the interior of the container at a subsequent work position and then spraying molten tin on the interior of the container while rotating the container at a work position immediately following the application of the flux thereto, the steps of applying of the flux and spraying of the tin being carried out with the container being maintained at an elevated temperature.

20. The method of applying a protective coating of tin to the interior of a metal container comprising the steps of rotatably supporting a series of containers in inverted positions at spaced intervals on a continuous conveyor then bodily moving said inverted containers sequentially in step by step movements through a series of work positions, preheating a container at the first of said work positions, then applying a flux to the interior of said preheated container at a subsequent work position, then spraying molten tin on the interior of said fluxed container while rotating the container at a work position immediately following the flux applying position, the steps of applying the flux and spraying the tin being carried out while maintaining the container at an elevated temperature and then heat treating and draining the container of excess tin at a series of subsequent work positions thereof.

21. The method of applying a protective coating of tin to the interior of a metal container wherein the container is rotatably supported in an inverted position and is then bodily moved in a step by step movement to a plurality of work positions comprising the steps of preheating the inverted container at the first of said work positions, then applying a flux to the interior of the inverted container at a subsequent work position, then rotating the inverted container and spraying molten tin on the interior thereof at a work position following the application of the flux thereto, the steps of applying the flux and spraying the tin on the interior of the container being carried out while maintaining the container at an elevated temperature and then heat treating the container and draining excess tin therefrom at a work position following the spraying of the tin on the interior of the container.

22. The method of applying a protective coating of tin to the interior of a metal container as defined in claim 21 wherein the excess tin drained from the container is maintained in molten condition and is recirculated to the position at which the tin is sprayed on the container.

References Cited in the file of this patent

UNITED STATES PATENTS

| Number | Name | Date |
|---|---|---|
| 1,196,155 | Rudolph et al. | Aug. 29, 1916 |
| 1,258,071 | Winter | Mar. 5, 1918 |
| 1,865,436 | Ferguson | July 5, 1932 |
| 2,166,634 | Lesage | July 18, 1939 |
| 2,383,023 | Sykes et al. | Aug. 21, 1945 |
| 2,390,498 | Capita | Dec. 11, 1945 |
| 2,397,733 | Gladfelter | Apr. 2, 1946 |
| 2,420,620 | Remington | May 13, 1947 |